Nov. 15, 1938.  R. V. TERRY  2,137,037

FILM DRIVING ELEMENT

Filed March 31, 1937

INVENTOR
R. V. TERRY
BY
G. H. Heydt.
ATTORNEY

Patented Nov. 15, 1938

2,137,037

UNITED STATES PATENT OFFICE 2,137,037

FILM DRIVING ELEMENT

Roy V. Terry, Montclair, N. J., assignor to Bell Telephone Laboratories, Incorporated, New York, N. Y., a corporation of New York Application March 31, 1937, Serial No. 134,031

8 Claims. (Cl. 271—2.3)

This invention relates to film propelling apparatus and more particularly to improvements in such apparatus employed to propel sound record films at uniform velocity.

In sound film recording and reproducing apparatus the sound film must be moved at uniform velocity past the recording or reproducing light beam. It has been found that a certain distortion is introduced into sound recorded on or reproduced from film driven by driving apparatus employing toothed sprockets as the driving elements. This distortion is evidenced as a 96 cycle modulation of the reproduced signal and is known to those skilled in the art as "96 cycle flutter". It has been determined that this distortion is produced by the interaction of the sprocket teeth of the film driving sprocket, which are of fixed pitch, with the marginal perforations of the film, whose pitch has been altered due to shrinkage of the film.

It is known that any disturbance introduced into the sound film velocity due to shrinkage of the film, such as 96 cycle flutter, may be eliminated by providing a driving mechanism in which the film is driven frictionally by a rotating bearing surface around which the film is partially wrapped. In such arrangements, however, a certain amount of either forward or backward slip of the film relative to the frictional driving surface is encountered and for this reason it is difficult to maintain synchronism between a sound record film and a picture film.

It is the object of this invention to provide a film driving means which will propel a film with a minimum amount of velocity variation.

A feature of the invention lies in the provision of a film driving element having a positively driven toothless driving member and a toothed driving member connected thereto by a resilient coupling, the toothed driving member acting as a means to restore the film to normal position with respect to the toothless driving member following any film movement disturbing the normal relation between the two driving members.

In accordance with applicant's invention there is provided a constant speed film driving element at or near the exposure aperture in the form of a positively driven drum and one or a pair of toothed discs resiliently coupled to the drum to engage the sprocket perforations of the film to be frictionally driven by the drum. The toothed disc is freely rotatable with respect to the driven drum but is connected thereto by resilient means in such a manner that following any relative movement of the disc with respect to the drum either forward or backward, the resilient means will act in a manner to restore the disc to its normal position with respect to the drum. The resiliently connected toothed disc insures the passage of a definite number of feet of sound film past the sound exposure aperture in a definite time.

The novel film driving element in accordance with this invention gives the smoothness of film motion obtainable by the use of a frictional film drive together with the advantage of the toothed sprocket drive in so far as the maintenance of synchronism between sound and picture films is concerned.

The invention may be more readily understood by reference to the accompanying drawing; in which Fig. 1 is a side elevation of a film recording machine employing a film driving element in accordance with the invention;

Figure 1:
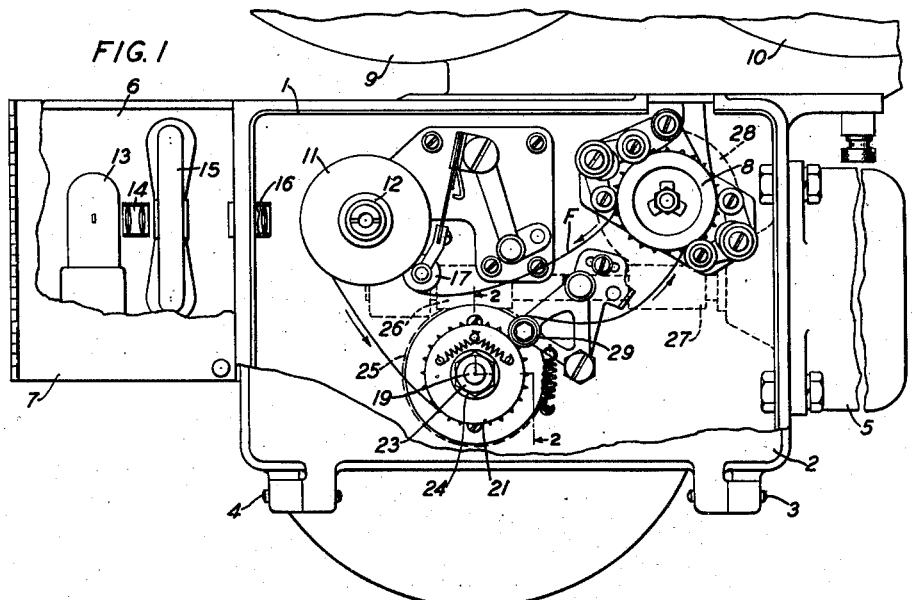

Referring to Fig. 1, the numeral 1 indicates a housing for film driving elements of a recording machine. This housing may be closed and made light-tight by means of a door 2 hinged at 3 and 4. A driving motor is mounted in a motor housing 5, secured to one vertical wall of housing 1 by suitable means. To another vertical wall of housing 1 is attached a housing 6 having a hinged door 7.

A feed and take-up sprocket 8 draws a film F from a feed reel located in a reel housing 9 and feeds the film to a take-up reel located in reel housing 10.

Film F travels over a flanged roller 11. This roller is freely rotatable on its shaft, being driven by movement of the film thereover and held against free rotation by frictional drag produced therein by means of a washer 12 which is urged against the side of roller 11 by a coil spring surrounding the roller shaft.

Light rays from a light source of constant intensity 13 are projected by condenser lens unit 14 to a light valve 15 employed to modulate the constant intensity light rays in accordance with the sounds to be recorded. Lens unit 16, mount- ed in the vertical side wall of housing 1, projects the valve modulated light to film F on roller 11. Retaining roller 17 applies the film F to the roller 11 at a point on the periphery of this roller which will insure that the film will be in engagement with approximately three-quarters of the surface of the roller.

Figure 2:
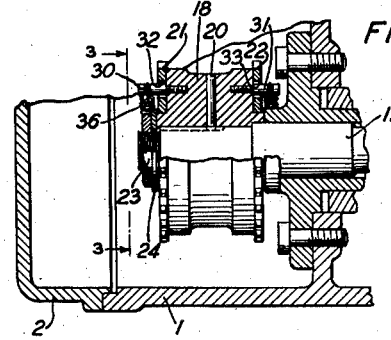
Fig. 2 is a view partially in section taken through line 2—2 of Fig. 1.

Film F is drawn past the exposure aperture by a driving element comprising a frictional film driving drum 18 (Fig. 2) secured for rotation with a driven shaft 19 by means of a pin 20, and a pair of toothed discs 21 and 22 rotatably mounted on the hub portion of drum 18. The drum 18 is retained on shaft 19 by means of a nut 23 engaging the threaded end of shaft 19. A washer 24 retained on shaft 19 by nut 23 provides means for limiting lateral movement of disc 21. Shaft 19 and drum 18 are positively connected to the driving motor through worm wheel 25 and worm gear 26. A worm wheel 27 attached to the motor shaft meshes with the worm gear 28 secured to the driving shaft for sprocket 8. A pivoted spring-held film retaining roller 29 engages the film on drum 18 to insure sufficient wrap of the film thereon.

Figure 3:
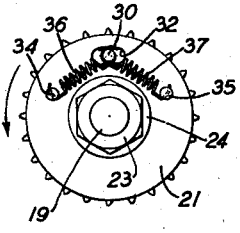
Fig. 3 is a view taken through line 3—3 of Fig. 2.

Pins 30 and 31 are secured in opposite side walls of drum 18. Toothed discs 21 and 22 have openings 32 and 33, respectively, to provide a clearance for pins 30 and 31. Each disc 21 and 22 has secured thereto two pins 34 and 35. As shown in Fig. 3, a coil spring 36 has one end anchored in pin 34 and its other end anchored in pin 30, while coil spring 37 has one end anchored in pin 35 and its other end anchored in pin 30. The structure and arrangement of pins and springs associated with disc 22 is identical with that shown in Fig. 3 in connection with disc 21.

These toothed discs 21 and 22, being resiliently mounted, will move with the film either forward or backward relative to the drum during the period of momentary disturbance in film velocity produced therein by the other elements of the driving system or by mismatch between the film perforations and the tooth pitch of the disc. The frictional drag produced between the drum and film during relative motion therebetween will tend to damp the amplitude of the disturbance. The coil springs 36 and 37 are made equal in strength so that when the drum and disc are in normal uniform running position, the pin 30 will remain at the center of opening 32 in the disc 21. These springs are of sufficient strength to restore the toothed discs and film slowly and evenly to normal position with respect to the driving drum within a short time following any forward or backward slip of the film relative to the drum in response to momentary disturbances in the film velocity.

Figure 5:
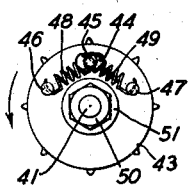
Fig. 5 is a view taken through line 5—5 of Fig. 4.
Figure 4:
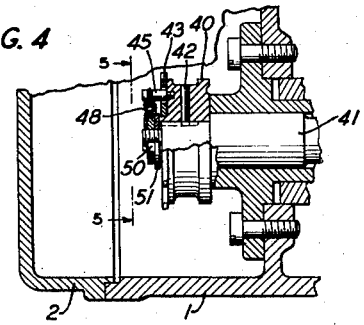
Fig. 4 is a disclosure of the invention applied to mechanism employed in driving smaller than standard width films.

Figs. 4 and 5 disclose the invention applied to a film driving mechanism employed for driving sound film of less than standard width in which only one row of sprocket perforations is supplied. A positively driven drum 40 is secured to a shaft 41 by a pin 42. A toothed disc 43 is rotatably mounted with respect to drum 40 and is provided with an aperture 44 to provide clearance for a pin 45 secured in the side wall of drum 40. Toothed disc 43 is provided with two projecting pins 46 and 47. Coil spring 48 has one end anchored in pin 46 and its other end anchored in pin 45. Coil spring 49 has one end anchored in pin 45 and its other end anchored in pin 47. A nut 50 and washer 51 are secured to the free end of shaft 41 to retain the drum 40 on the shaft 41 and to retain the disc 43 on drum 40.

What is claimed is:

1. A film driving element comprising a positively driven film supporting roller, a toothed disc, and resilient means connecting said roller and said disc.

2. A film driving element comprising a positively driven film supporting roller, a flat circular member having spaced projections on its periphery, and resilient means connecting said roller and said flat circular member.

3. A film driving element comprising a film supporting roller, a toothed disc adjacent one end of said roller, but rotatable with respect thereto, and resilient means connecting said roller and said disc.

4. In a film driving apparatus, a driving shaft, a film supporting drum attached to said shaft, a circular toothed member adjacent said drum and freely rotatable with respect to said shaft and drum, and resilient means connecting said drum and disc.

5. In combination in an apparatus for propelling a marginally perforated film, means for driving said film, said means comprising a driving shaft, a roller secured to said shaft and having portions of the surface thereof in the path of movement of certain of the non-record areas of said film, a toothed disc freely rotatable with respect to said roller and shaft disposed in the path of movement of the marginal perforations of said film, and resilient means coupling said disc and said roller.

6. A film driving element comprising a positively driven frictional film driving means, a circular toothed member adjacent said driving means and rotatable with respect thereto, means coupling said driving means and said toothed member, said means comprising a pair of resilient elements acting in opposite directions to maintain said toothed member in normal running position with respect to said driving means.

7. A composite sectional film driving element, comprising a frictional drive section and a positive drive section, said sections being arranged for relative rotation.

8. A composite sectional film driving roller, comprising a frictional drive section and a positive drive section, said sections being arranged for damped relative rotation.

ROY V. TERRY.